US012132245B2

(12) United States Patent
Letestu et al.

(10) Patent No.: US 12,132,245 B2
(45) Date of Patent: Oct. 29, 2024

(54) APPARATUS COMPRISING AN INNER WAVEGUIDE AND A COAXIAL WAVEGUIDE CONFIGURED TO BE FED WITH FIRST AND SECOND FREQUENCY SIGNALS THROUGH A TUNABLE COAXIAL TURNSTILE JUNCTION

(71) Applicant: Nokia Shanghai Bell Co., Ltd., Shanghai (CN)

(72) Inventors: Yoann Letestu, Sainte-Anne sur Brivet (FR); Denis Tuau, Trignac (FR)

(73) Assignee: NOKIA SHANGHAI BELL CO., LTD., Shanghai (CN)

( * ) Notice: Subject to any disclaimer, the term of this patent is extended or adjusted under 35 U.S.C. 154(b) by 923 days.

(21) Appl. No.: 17/050,651

(22) PCT Filed: Apr. 26, 2019

(86) PCT No.: PCT/CN2019/084677
§ 371 (c)(1),
(2) Date: Oct. 26, 2020

(87) PCT Pub. No.: WO2019/206305
PCT Pub. Date: Oct. 31, 2019

(65) Prior Publication Data

US 2021/0242587 A1 Aug. 5, 2021

(30) Foreign Application Priority Data

Apr. 27, 2018 (EP) .................................... 18305530

(51) Int. Cl.
*H01P 1/213* (2006.01)
*H01P 1/16* (2006.01)
(Continued)

(52) U.S. Cl.
CPC .............. *H01P 1/2131* (2013.01); *H01P 1/16* (2013.01); *H01P 1/2138* (2013.01); *H01P 5/20* (2013.01); *H01Q 5/47* (2015.01); *H01Q 5/50* (2015.01)

(58) Field of Classification Search
CPC .... H01P 1/2131; H01P 1/2132; H01P 1/2138; H01P 5/20
(Continued)

(56) References Cited

U.S. PATENT DOCUMENTS 3,268,902 A * 8/1966 Turrin ...................... H01Q 5/45 343/785
3,508,277 A * 4/1970 Ware et al. .............. H01Q 5/45 343/776
(Continued)

FOREIGN PATENT DOCUMENTS

CN 102136634 A 7/2011
CN 103094718 A 5/2013
(Continued)

OTHER PUBLICATIONS

Zhang, Enze, "Reserch on the Multi-Frequency Feed Antenna in Remote Sensing Detection" Dissertation for the Master's Degree in Engineering, Harbin Institute of Technology, School of Electronics and Information Engineering, Jun. 2016; 91 pgs; https://www.doc88.com/p-9416301957551.html.
(Continued)

*Primary Examiner* — Benny T Lee
(74) *Attorney, Agent, or Firm* — Lippes Mathias LLP

(57) ABSTRACT

A multiband antenna feed, an antenna incorporating the multiband antenna feed and a method are disclosed. An apparatus, comprises: a first port which may be configured to convey a first signal at a first frequency. A second port may configured to convey a second signal at a second
(Continued)

frequency. The second frequency may be higher than the first frequency. A third port may be configured to convey the first signal and the second signal with a feed for a multiband antenna. The third port may have an inner waveguide and a coaxial waveguide. A first network may couple the first port with the coaxial waveguide and may be configured to propagate the first signal between the first port and the coaxial waveguide. A second network may couple the second port with the inner waveguide and may be configured to propagate the second signal between the second port and the inner waveguide.

26 Claims, 10 Drawing Sheets

(51) Int. Cl.
*H01P 5/20* (2006.01)
*H01Q 5/47* (2015.01)
*H01Q 5/50* (2015.01)

(58) Field of Classification Search
USPC .......................................................... 333/126
See application file for complete search history.

(56) References Cited

U.S. PATENT DOCUMENTS

| | | | |
|---|---|---|---|
| 3,922,621 A | 11/1975 | Gruner | |
| 4,491,810 A | 1/1985 | Saad | |
| 4,504,805 A | 3/1985 | Ekelman, Jr. et al. | |
| 5,793,335 A | 8/1998 | Anderson et al. | |
| 6,005,528 A | 12/1999 | Preiss et al. | |
| 6,600,387 B2 * | 7/2003 | Cook et al. | H01P 1/2131 333/135 |
| 6,720,932 B1 | 4/2004 | Flynn et al. | |
| 2002/0163401 A1 | 11/2002 | Zhang | |
| 2014/0266934 A1 | 9/2014 | Cook et al. | |
| 2015/0097747 A1 | 4/2015 | Hwang et al. | |

FOREIGN PATENT DOCUMENTS

| | | |
|---|---|---|
| CN | 104979638 A | 10/2015 |
| CN | 205122777 U | 3/2016 |
| CN | 105958205 A | 9/2016 |
| CN | 107248619 A | 10/2017 |
| CN | 107910650 A | 4/2018 |
| EP | 1158597 A1 | 11/2001 |
| EP | 2355234 A1 | 8/2011 |
| JP | S60 1902 A | 1/1985 |
| WO | 2008/008702 A2 | 1/2008 |

OTHER PUBLICATIONS

Dubrovka F et al, "Novel high performance coherent dual-wideband orthomode transducer for coaxial horn feeds" 2017 XI International Conference on Antenna Theory and Techniques (ICATT), Kyiv, Ukraine, pp. 277-280, XP116025A.

Zhang Enze et al, "Design of a multi-band orthomode transducer for radiometers", Microwave Engineering Dept, Harbin Institute of Technology, China, IDSAP2017, Phuket, Thailand. 2 pages, XP3285274A.

International Search Report for PCT/CN2019/084677 dated Jul. 26, 2019.

* cited by examiner

APPARATUS COMPRISING AN INNER WAVEGUIDE AND A COAXIAL WAVEGUIDE CONFIGURED TO BE FED WITH FIRST AND SECOND FREQUENCY SIGNALS THROUGH A TUNABLE COAXIAL TURNSTILE JUNCTION

TECHNOLOGICAL FIELD

Various example embodiments relate to a multiband antenna feed, an antenna incorporating the multiband antenna feed and a method.

BACKGROUND

With the forthcoming future 5G mobile networks planned for 2020, modern communication applications like video streaming, mobile TV and other smart phone applications requiring high data rate communications, up to 10 Gbps, will challenge the wireless transport in the near future. "Bands and Carrier Aggregation" (BCA) for backhaul application is a possible concept that could be exploited to enhance radio link performance and consists in associating two separated backhaul frequency bands for one radio link. This combination ensures a higher bandwidth, longer transmission distance, while optimizing the quality of service (QOS). Wireless transport radio links are typically provided by microwave parabolic antenna solutions. These antennas operate only in single frequency bands defined by regulations. A dual or multi band microwave antenna solution provides an opportunity for reducing tower leasing costs, installation time and for lightening the tower structure. It is desired to provide an improved multiband antenna feed.

SUMMARY

According to various, but not necessarily all, embodiments of the invention there is provided an apparatus, comprising: a first port which may be configured to convey a first signal at a first frequency. A second port may be configured to convey a second signal at a second frequency. The second frequency may be higher than the first frequency. A third port may be configured to convey the first signal and the second signal with a feed for a multiband antenna. The third port may have an inner waveguide and a coaxial waveguide. A first network may couple the first port with the coaxial waveguide and may be configured to propagate the first signal between the first port and the coaxial waveguide. A second network may couple the second port with the inner waveguide and may be configured to propagate the second signal between the second port and the inner waveguide.

The coaxial waveguide may at least partially surround the inner waveguide.

An inner surface of the coaxial waveguide may define an outer surface of the inner waveguide.

An inner diameter of the inner circular waveguide may be selected to propagate a designated mode. An outer diameter of inner circular waveguide together with the inner diameter of the coaxial waveguide may be selected to propagate a second designated mode.

The inner circular waveguide may be dimensioned to propagate a $TE_{11}$ circular mode. The coaxial waveguide may be dimensioned to propagate a $TE_{11}$ coaxial mode.

The first network may comprise a junction configured to convert the first signal between a first mode in the first network and a coaxial mode in the coaxial waveguide.

The first network may comprise a first signal splitter configured to convert between the first signal and an in-phase first signal and an opposing phase first signal.

The first signal splitter may comprise a T-junction splitter having a splitter port configured to convey the first signal. An in-phase port may be configured to convey the in-phase first signal and an opposing phase port may be configured to convey the opposing phase first signal.

The first network may comprise a first pair of coupling waveguides, one of the coupling waveguides coupling the in-phase port with the junction. Another of the coupling waveguides coupling the opposing phase port with the junction.

The one of the coupling waveguides may couple with one side of the junction. The another of the coupling waveguides couples with an opposing side of the junction.

The feed may comprise a fourth port configured to convey a third signal at a third frequency and with a differing polarization to the first signal. The third frequency may be higher than the first frequency. The first network may couple the fourth port with the coaxial waveguide and may be configured to propagate the third signal between the fourth port and the coaxial waveguide. The third frequency may match the first frequency.

The first network may comprise a second signal splitter configured to convert between the third signal and an in-phase third signal and an opposing phase third signal.

The second signal splitter may comprise a T-junction splitter having a splitter port configured to convey the third signal. An in-phase port may be configured to convey the in-phase third signal. An opposing phase port may be configured to convey the opposing phase third signal.

The first network may comprise a second pair of coupling waveguides. One of the coupling waveguides may couple the in-phase port with the junction. Another of the coupling waveguides may couple the opposing phase port with the junction.

The one of the coupling waveguides may couple with one side of the junction. The another of the coupling waveguides may couple with an opposing side of the junction.

The second pair of coupling waveguides may couple with the junction at positions intermediate the first pair of coupling waveguides.

The junction may have waveguides extending radially therefrom. Each may be coupled with a corresponding coupling waveguide.

The waveguides may comprise tuning protrusions.

The junction may comprise tuning surface variations intermediate the waveguides.

The junction may comprise a coaxial turnstile junction.

The first signal and third signal may have a matching frequency and differing polarizations.

Portions of the first network may comprise waveguides of differing orientations.

The first network may comprise a rotator configured to change a polarization of a signal passing therethrough.

The first network may comprise rectangular waveguides.

The inner waveguide may comprise a circular waveguide.

The second network may comprises one of a rectangular-to-circular waveguide transition and a circular-to-circular waveguide transition.

The multiband antenna feed may be defined by a series of stacked plates.

The feed may comprise a backfire dual band feed. The antenna may comprise a parabolic antenna.

According to various, but not necessarily all, embodiments of the invention there is provided an antenna comprising the multiband antenna feed set out above.

According to various, but not necessarily all, embodiments of the invention there is provided a method, comprising: conveying a first signal at a first frequency at a first port; conveying a second signal at a second frequency at a second port, the second frequency being higher than the first frequency; coupling the first port with a coaxial waveguide using a first network configured to propagate the first signal between the first port and the coaxial waveguide; coupling the second port with an inner waveguide using a second network configured to propagate the second signal between the second port and the inner waveguide; and conveying the first signal and the second signal with a third port having the inner waveguide and the coaxial waveguide and a feed for a multiband antenna.

The method may comprise features corresponding to features of the multiband antenna feed and antenna set out above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided. An embodiment provides a multiband antenna feed which has a first port which is adapted or configured to convey a radio frequency (RF) signal at one frequency and a second port which is adapted or configured to convey a signal at a second frequency. A network couples the first port with a coaxial waveguide of an antenna feed port and is configured or dimensioned to allow the signal to propagate between the first port and the coaxial waveguide of the antenna feed port. The network typically conveys the signal in one mode and conveys the signal in the coaxial waveguide in another mode. Another network couples the second port with an inner or circular waveguide of the antenna feed port and is configured or dimensioned to allow the second signal to propagate between the second port and the circular waveguide of the antenna feed port. The second network typically conveys the second signal in one mode and excites the signal in the circular waveguide in another mode. The antenna feed port is typically arranged to convey the first and second signal between the networks and a backfire dual band feed for a parabolic antenna. The arrangement where the first signal is propagated via the first network and the coaxial waveguide provides a waveguide layout which enables the second signal to be conveyed via a simple network straight through the feed and propagate that signal either via a rectangular port or using a rectangular-to-circular transition or via a circular port with the possibility of propagating both polarizations (vertical and horizontal) in a $TE_{11}$ circular mode. This is possible since the second network is straight, without bending, which avoids polarization rotation. This provides for a compact multiband antenna feed which conveys the signals with the appropriate parts of the backfire dual band feed in an efficient and compact manner.

Antenna Feed

Figure 1:
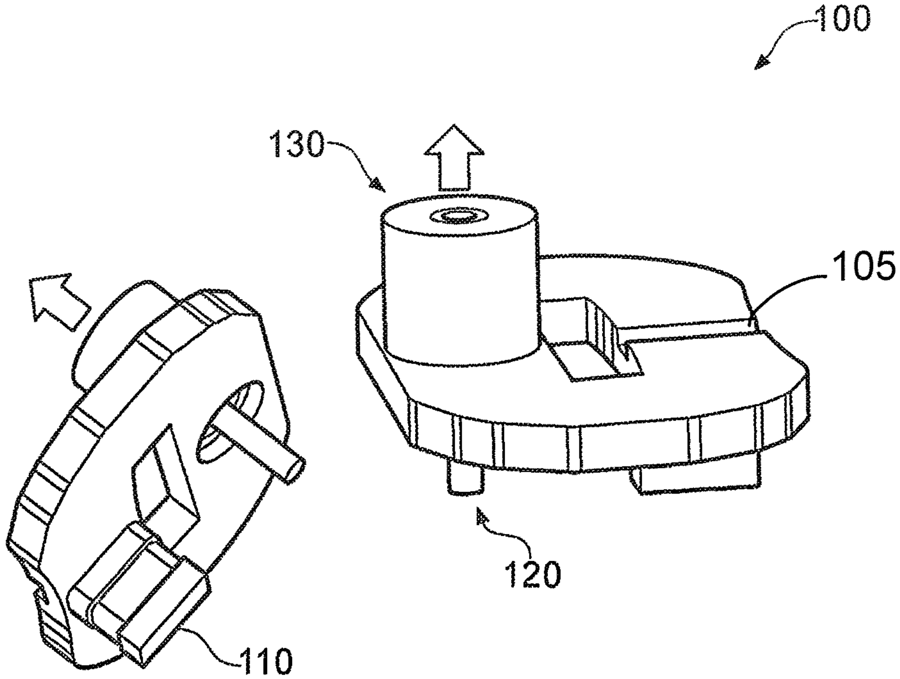
FIG. 1 illustrates an example multiband antenna feed of the subject matter described herein.

FIG. 1 illustrates an example multiband antenna feed 100. The outlines illustrated in FIG. 1 show the spatial void 105 of the multiband antenna feed 100, which is then metallised. The multiband antenna feed 100 has a first feed port 110 and a second feed port 120. The multiband antenna feed 100 also has a coaxial antenna port 130.

In operation, RF signals provided by a microwave backhaul radio unit, also referred to as a "microwave outdoor unit" (not shown), are typically carried by a rectangular waveguide operating in the fundamental mode, $TE_{10}$, particularly in millimetre wave frequencies in order to reduce insertion losses. For carrier aggregation systems, two radio units are used, including two rectangular waveguides, one waveguide for the low frequency band and the other waveguide for the high frequency band. The low frequency band waveguide is coupled with the first port 110 and the high frequency band waveguide is coupled with the second port 120. The multiband antenna feed 100 receives the low frequency band signal and the high frequency band signal, converts the low frequency band signal to a $TE_{11}$ coaxial waveguide mode which is supplied by a coaxial waveguide of the coaxial antenna port 130 and converts the high frequency signal to a $TE_{11}$ circular waveguide mode which is supplied by a circular waveguide of the coaxial antenna port 130.

Antenna Port

Figure 2:
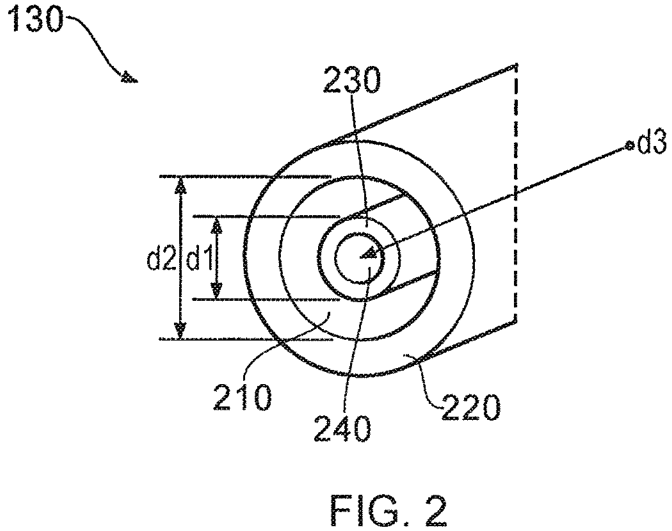
FIG. 2 illustrates schematically an example coaxial antenna port of the subject matter described herein.

FIG. 2 illustrates schematically the arrangement of the coaxial antenna port 130 in more detail. A coaxial waveguide 210 is defined by the void between an inner surface of an outer conductor 220 and the outer surface of an inner conductor 230. The coaxial waveguide 210 is dimensioned by selecting the inner diameter d1 and the outer diameter d2 in order to properly propagate the $TE_{11}$ coaxial waveguide mode. For example, when operating in the frequency band 17.7-19.7 GHZ for the low frequency band of a dual band arrangement, the inner diameter is set to 5.20 mm and the outer diameter is set to 13.50 mm. The internal diameter d3 of the inner conductor 230 is selected to properly propagate the $TE_{11}$ circular waveguide mode. For example, when operating in the frequency band 71-86 GHZ, the diameter d3 is set to 3.12 mm. However, it will be appreciated that operating in other frequency bands is possible with appropriately sized waveguides. The frequency pairing can be V-band, E-band or future new millimetre wave bands (D-band) for the high frequency band and another frequency from the traditional backhauling frequency band from 6 to 42 GHZ. The frequency pairing can be a microwave/millimetre wave frequency pairing. The pairing can also be a combination of two traditional microwave frequency bands like 13/38 GHz.

Dual Band Backfire Feed

Figure 3:
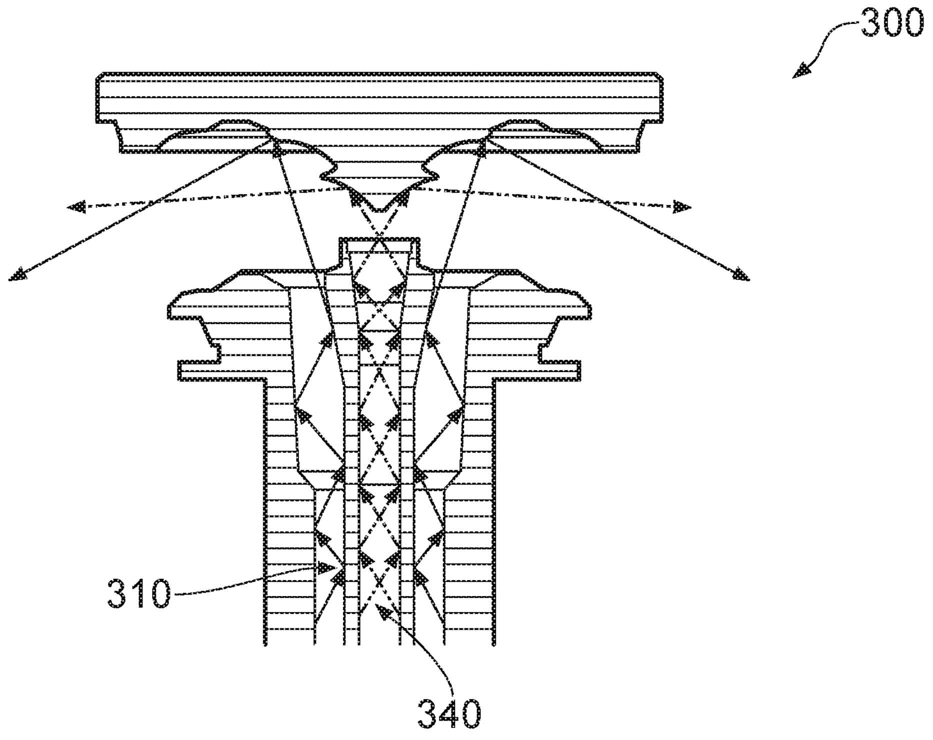
FIG. 3 illustrates an example dual band backfire feed of the subject matter described herein.

FIG. 3 illustrates a dual band backfire feed 300, which conveys RF signals with a dual band parabolic antenna (not shown). The high frequency $TE_{11}$ circular waveguide mode signal is received from the circular waveguide 240 (FIG. 2) and propagates along the circular waveguide 340 of the dual band backfire feed 300. Likewise, the low frequency $TE_{11}$ coaxial mode signal is received by the coaxial waveguide 310 from the coaxial waveguide 210 of the multiband antenna feed 100. As with the coaxial antenna port 130, the outer wall of the circular waveguide 340 is also the inner wall of the coaxial waveguide 310.

Figure 4:
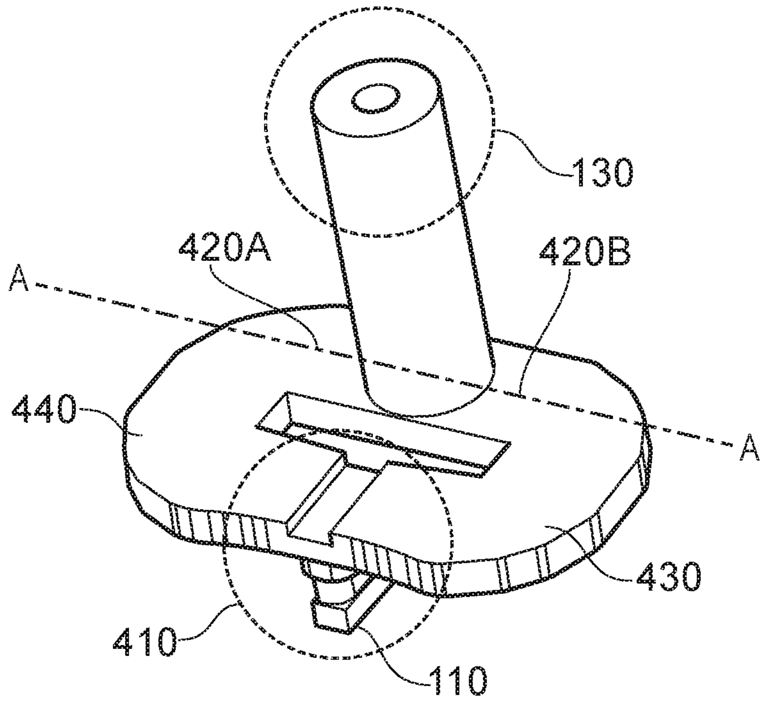
FIG. 4 illustrates a further view of the multiband antenna feed of the subject matter described herein.
Figure 7:
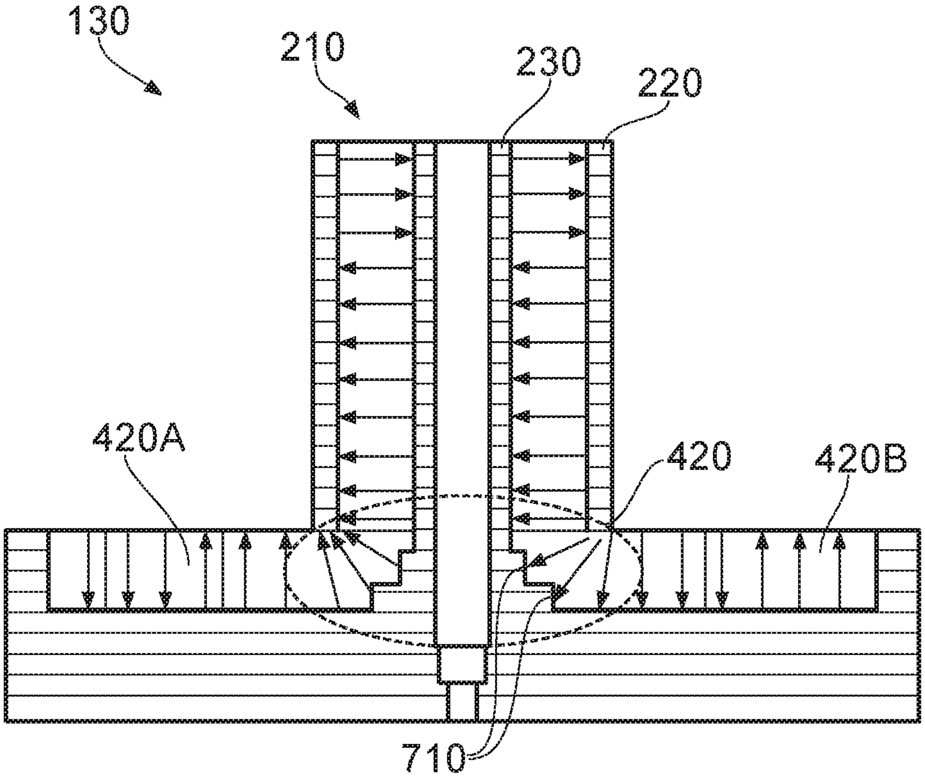
FIG. 7 is a partial section through the multiband antenna feed along the line AA of the subject matter described herein.

FIG. 4 illustrates a further view of the multiband antenna feed 100 (FIG. 1). As described above, the coaxial antenna port 130 couples with the dual band backfire feed 300 as shown in FIG. 3. The multiband antenna feed 100 (FIG. 1) has an E-plane T-junction 410 coupled with the first port 110, together with a coaxial turnstile junction 420 (FIG. 7). The E-plane T-junction 410 together with the coaxial turnstile junction 420 (FIG. 7) operate to excite a $TE_{11}$ coaxial waveguide mode in the coaxial waveguide 210 (FIG. 2) from a $TE_{10}$ rectangular mode signal provided to the first port 110, as will now be described in more detail.

T-Junction

Figure 5:
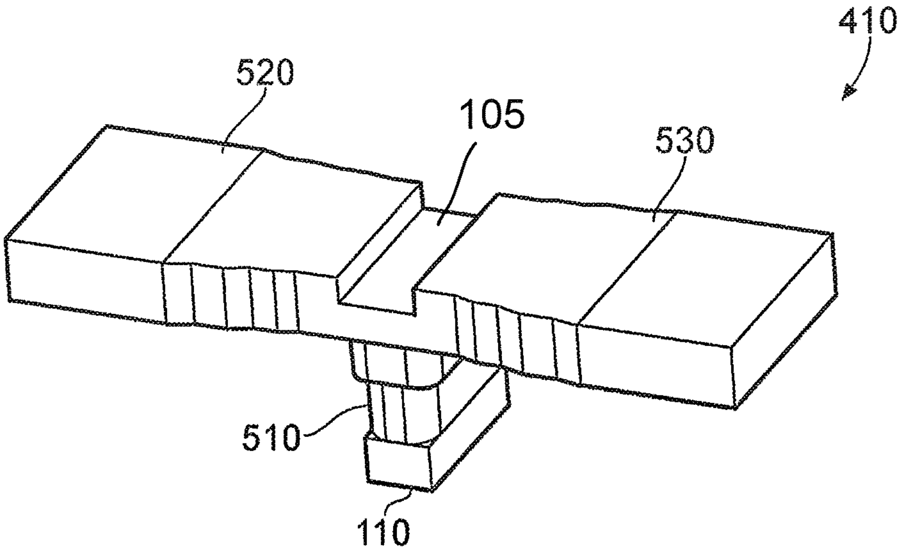
FIG. 5 illustrates an example E-plane T-junction of the subject matter described herein.

FIG. 5 illustrates the E-plane T-junction 410 (FIG. 4) (as mentioned above, the void shown is then metallised to define the structure). The low frequency input signal is received in $TE_{10}$ rectangular mode via a rectangular waveguide at the rectangular first port 110. The signal propagates along a waveguide 510 and is split into two signals which travel separately along branching waveguides 520, 530.

Figure 6:
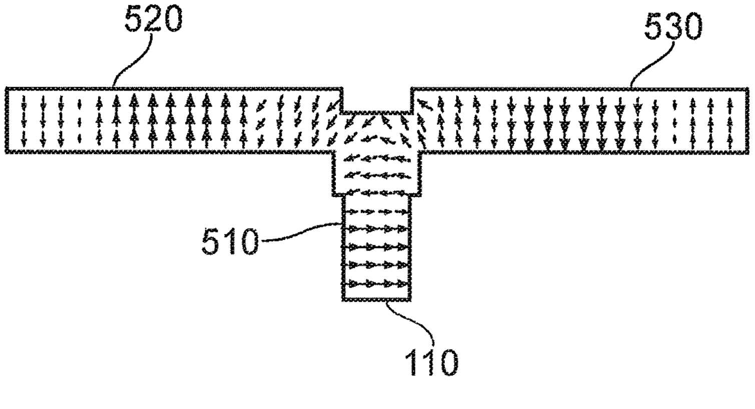
FIG. 6 is a sectional view through the E-plane T-junction of the subject matter described herein.

As can best be seen in FIG. 6 which is a sectional view through the E-plane T-junction 410 (FIG. 5) including the first port 110 and waveguide 510, the signal travelling along the waveguide 520 and the signal travelling along the waveguide 530 have opposite phase (i.e. they are 180 degrees out of phase)

Returning now to FIG. 4, the signal travelling along waveguide 530 (FIG. 5) propagates along looped waveguide 430 to one side 420B of the coaxial turnstile junction. The out of phase signal travelling along waveguide 520 (FIG. 5) propagates along looped waveguide 440 and to another side 420A of the coaxial turnstile junction. The arrangement of the E-plane T-junction 410 and the looped waveguides 430, 440 are identical and symmetric, in order that the out of phase signals are received at either side 420A, 420B of the coaxial turnstile junction simultaneously.

Coaxial Turnstile Junction

Figure 8:
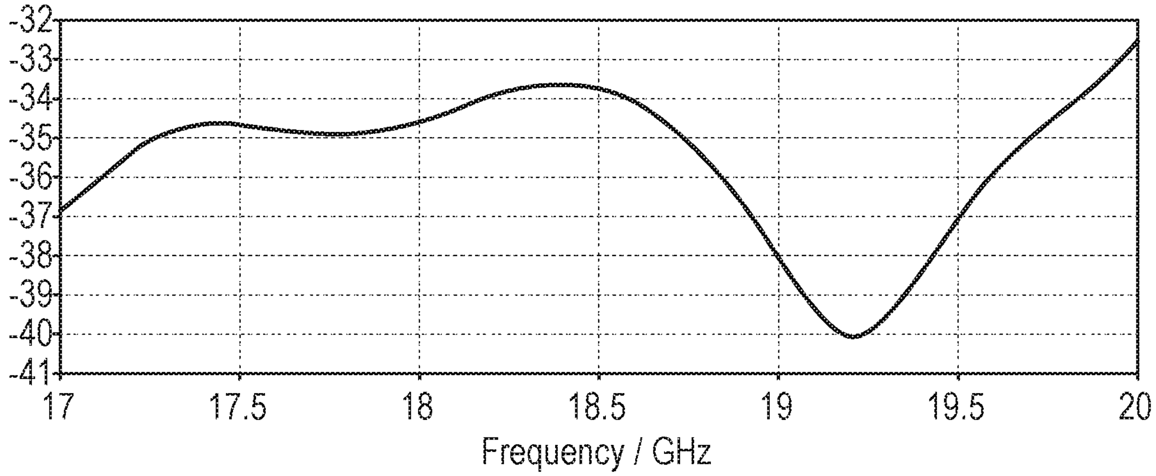
FIG. 8 shows a return loss performance of the coaxial turnstile junction for one polarization of the subject matter described herein.

FIG. 7 is a partial section through the multiband antenna feed 100 (FIG. 1) including outer conductor 220 and inner conductor 230 along the line AA (FIG. 4). The sides 420A, 420B of the coaxial turnstile junction 420 receive the two out of phase low frequency signals supplied by the E-plane T-junction 410 (FIG. 4) via the respective looped waveguides 430, 440 (FIG. 4). The rectangular waveguides on either side 420A, 420B of the turnstile junction 420 couple with the coaxial waveguide 210 of the coaxial antenna port 130. A series of stepped, differing diameter annular rings 710 define the transition between the rectangular waveguides and the coaxial waveguide 210. Accordingly, the coaxial turnstile junction 420 excites directly the $TE_{11}$ coaxial mode across the coaxial waveguide 210 from the signals received from the two rectangular waveguides. The dimensions of the rectangular waveguides and the circular steps of the turnstile junction 420 are optimized to achieve the $TE_{11}$ coaxial mode with a low return loss, as illustrated in FIG. 8 which shows the return loss versus frequency in GHz performance of the coaxial turnstile junction 420 for one polarization. In order to properly feed the $TE_{11}$ coaxial waveguide mode, the phase of the electrical fields of the two rectangular waveguides needs to have a phase difference of 180 degrees (opposite phase).

Second Feed

Figure 9:
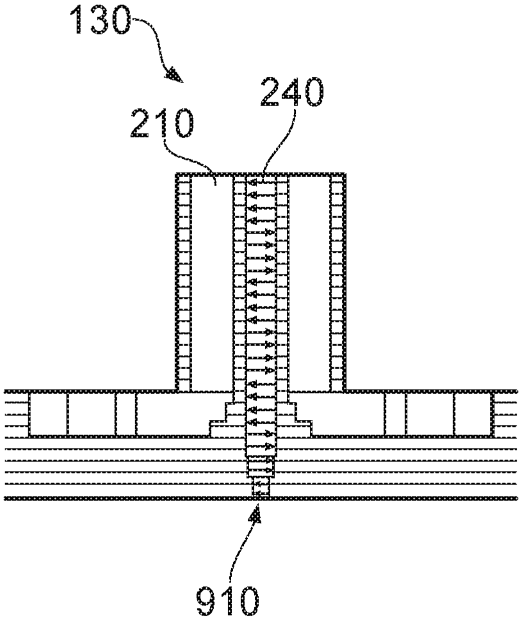
FIG. 9 is a partial section along the line AA showing two arrangements for the coupling with the second user port of the subject matter described herein.

FIG. 9 is also a section along the line AA (FIG. 4) showing two arrangements for the coupling with the second port 120 (FIG. 1). The provision of the coaxial turnstile junction 420 (FIG. 7) and the E-plane T-junction 410 (FIG. 4) separates the low frequency band signal from the centre of the coaxial antenna port 130 and feeds the low frequency band signal via the outer coaxial waveguide 210. Accordingly, the inner circular waveguide 240 (FIG. 2) can be used to propagate the high frequency signal independently of the low frequency signal. Accordingly, the circular waveguide 240 extends to either a rectangular-circular transition 910 or a circular-circular transition 920, depending on whether the feed from the radio box (or radio communication equipment) is circular or rectangular. This allows freedom to independently select the polarization of the high frequency band compared to the low frequency band, with the possibility of having either a single vertical or horizontal polarization according to the rectangular-circular transition position or a dual polarization via the circular-circular waveguide transition 920.

Dual Coaxial Turnstile Junction

Figure 10:
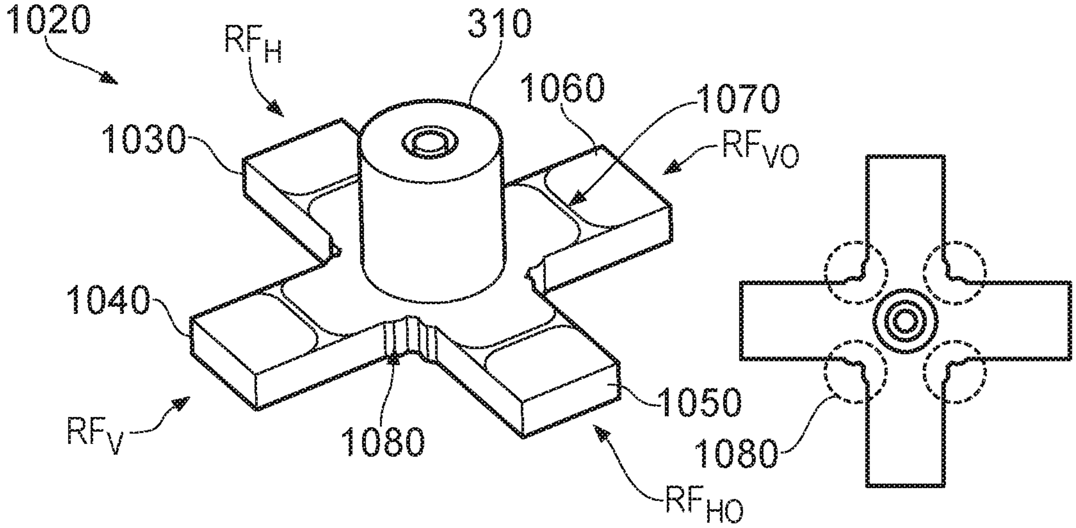
FIG. 10 illustrates an alternative turnstile junction which supports dual polarization in the low frequency band of the subject matter described herein.

FIG. 10 illustrates an alternative turnstile junction 1020 which supports dual polarization in the low frequency band. The coaxial turnstile junction 1020 has four waveguides 1030, 1040, 1050, 1060. The waveguides 1030-1060 extend radially from the coaxial waveguide 310 and the turnstile junction 1020 has a stepped annular ring structure mentioned above. Waveguide 1030 receives an RF signal $RF_H$ in a horizontal polarization and the opposing waveguide 1050 receives an out of phase RF signal $RF_{HO}$. Waveguide 1040 receives an RF signal $RF_V$ in a vertical polarization and the opposing waveguide 1060 receives an out of phase RF signal $RF_{VO}$.

Each waveguide is provided with a fine tuning step 1070 to improve return loss and isolation performance. Likewise, the connecting portions between adjacent waveguides comprise excrescences or protrusions 1080 again to improve return loss and isolation performance. This arrangement allows for dual polarization in the low frequency band of the feeding system to excite the two polarizations inside the dual band backfire feed 300. As mentioned above, the dual polarization inside the coaxial waveguide 210 is achieved by the coaxial turnstile junction 1020 which has the benefit of supporting separate vertical and horizontal polarizations while remaining compact.

Figure 11:
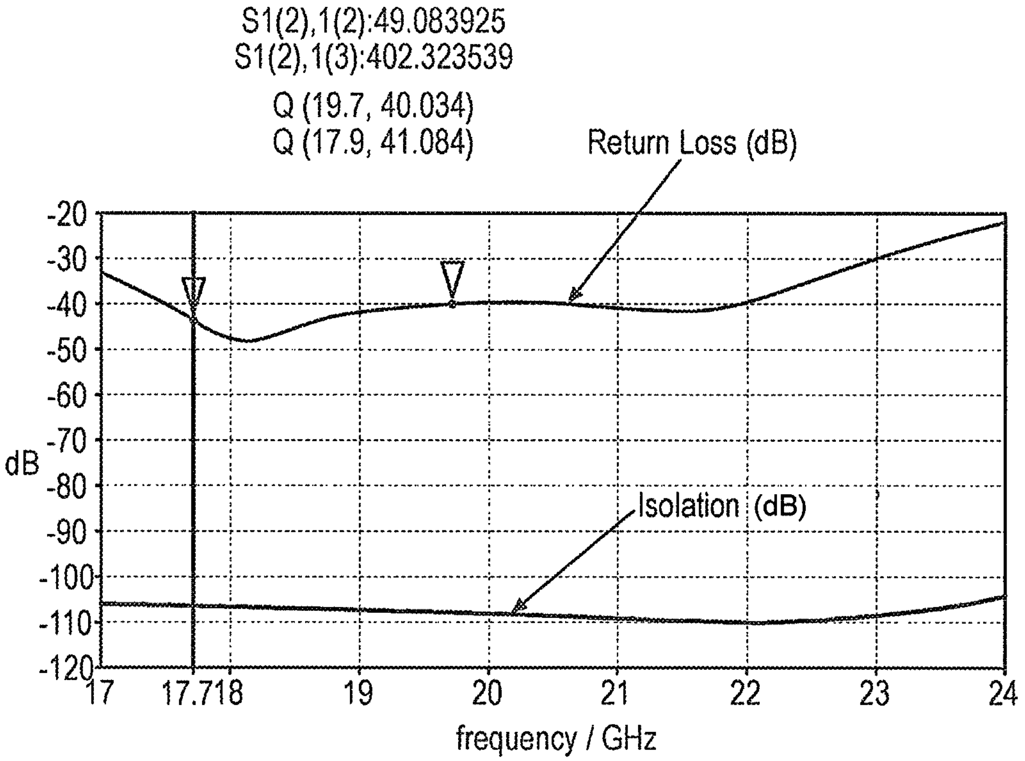
FIG. 11 illustrates the return and isolation between the polarizations of the coaxial turnstile junction of the subject matter described herein.

FIG. 11 illustrates the return loss and isolation in dB versus frequency in GHz between the polarizations of the coaxial turnstile junction 1020 shown in FIG. 10.

Dual Polarization Antenna Feed

Figure 12:
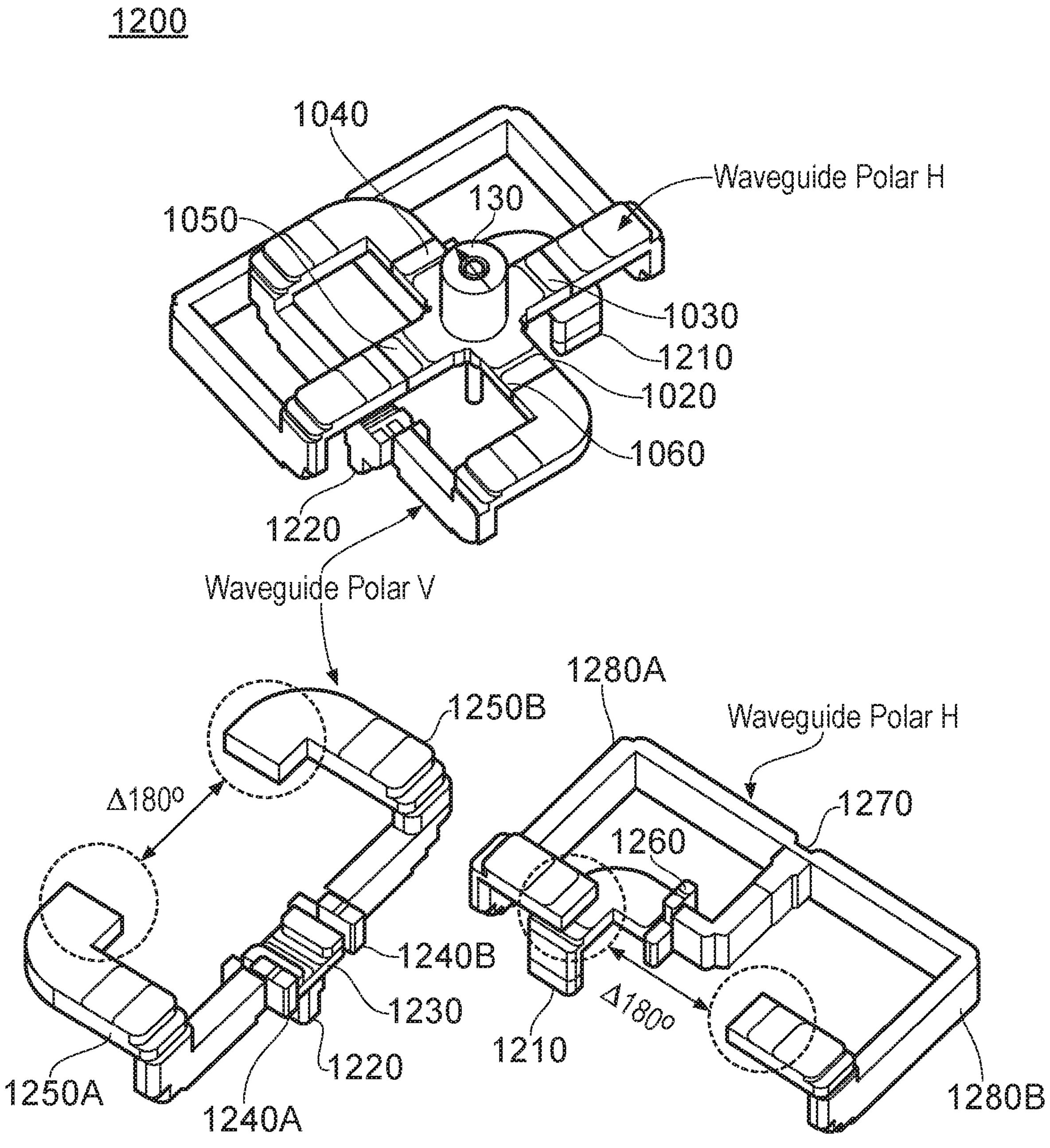
FIG. 12 illustrates an example dual polarization multiband antenna feed of the subject matter described herein.

As with the single polarization approach referring to FIG. 12, the two rectangular waveguides (designated by Waveguide Polar H and Waveguide Polar V) feeding the coaxial turnstile junction 1020 (including waveguides 1030, 1040, 1050 and 1060) with the two polarization signals are bent. The waveguides are also combined via two E-plane T-junctions to create two distinct rectangular waveguide input access ports, as is illustrated at 1200 of FIG. 12.

A vertical polarization low frequency signal is received through a port 1220, which is coupled with an E-plane T-junction 1230. The vertical polarization signal is split in two, in a similar manner to that described with reference to FIG. 5 above, and the opposite phase signals pass through respective V-plane to E-plane waveguide symmetric rotators 1240A, 12040B which propagates the signals into respective looped waveguides 1250A, 1250B. The opposite phase vertical polarized signals (Δ180°) are then received by the coaxial turnstile junction 1020.

A horizontal polarized low frequency signal is received by a port 1210. The signal passes through an H-plane to E-plane waveguide symmetric rotator 1260 and is received by an E-plane T-junction 1270. The E-plane T-junction 1270 generates two horizontal polarization signals with opposite phases (Δ180°) which pass along respective looped waveguides 1280A, 1280B. The two opposite phase signals are then received by the coaxial turnstile junction 1020.

Figure 13:
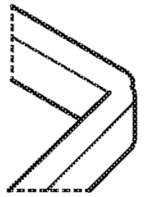
FIG. 13 illustrates an example bend in the multiband antenna feed of the subject matter described herein.

As can be seen in FIG. 13, in order to obtain a compact arrangement, the waveguide is bent in the H-plane.

Figure 14:
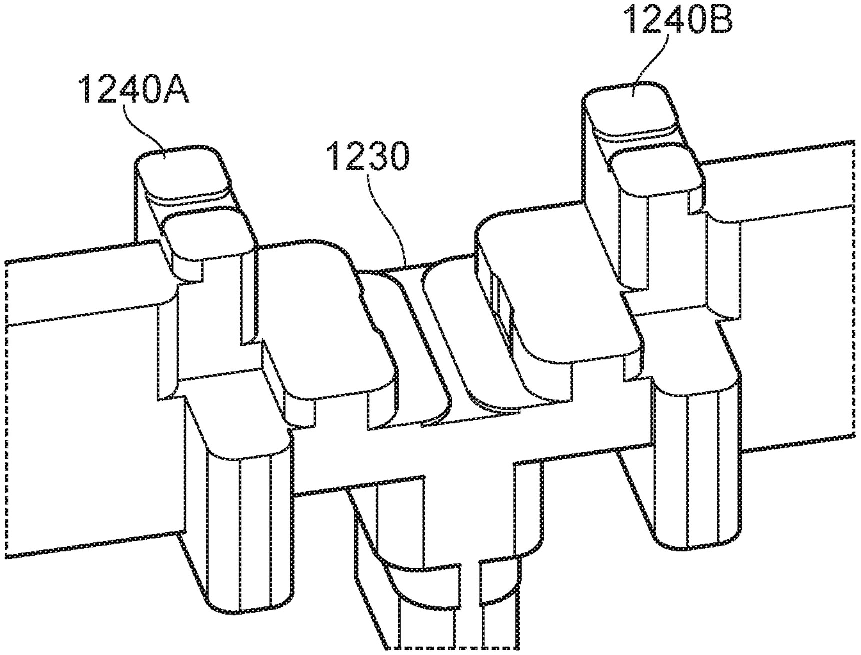
FIG. 14 illustrates an example symmetric rotator in the multiband antenna feed of the subject matter described herein.
Figure 14:
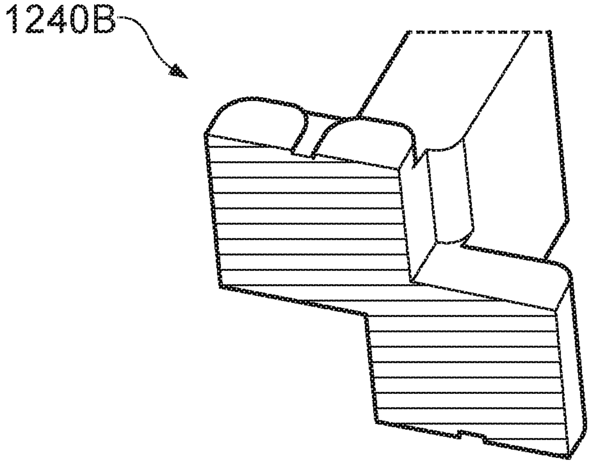

In addition, as shown in FIG. 14, which shows an E-plane T-junction 1230, H or V-plane to E-plane waveguide symmetric rotators 1240A, 1240B are provided which keeps the feeding system to a minimum footprint and as compact as possible, since the rotator part twists the plane of the waveguide. The design is symmetric and can be machined readily into shells.

Figure 15:
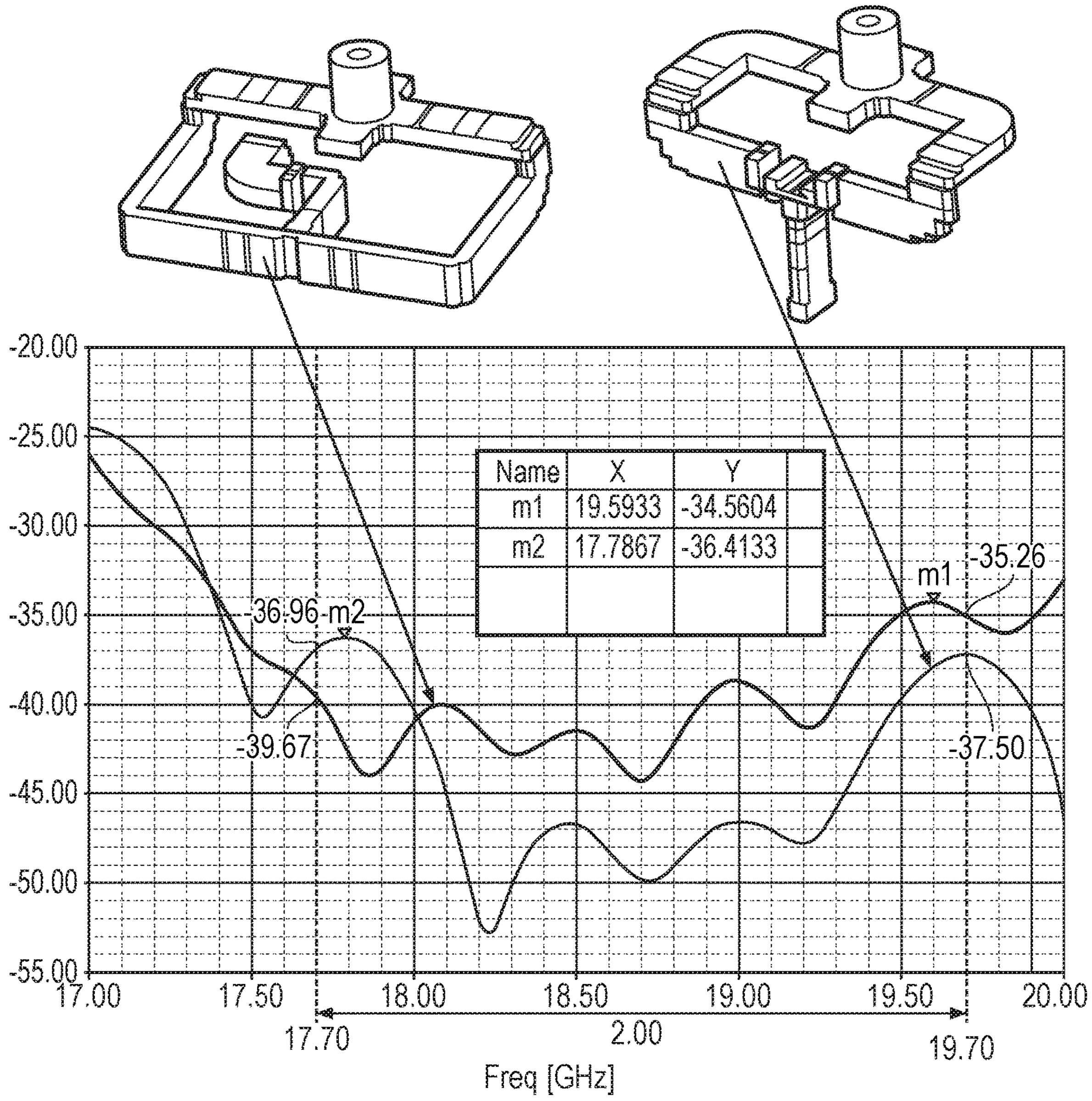
FIG. 15 illustrates the return loss and isolation between the polarizations of the coaxial turnstile junction of the subject matter described herein.

Each waveguide access and path are optimized to obtain a low return loss versus frequency in GHz performance, as illustrated in FIG. 15 and keep a perfect opposition phase on each side of the waveguide that excites the coaxial turnstile junction.

Stacked Antenna Feed

Figure 16:
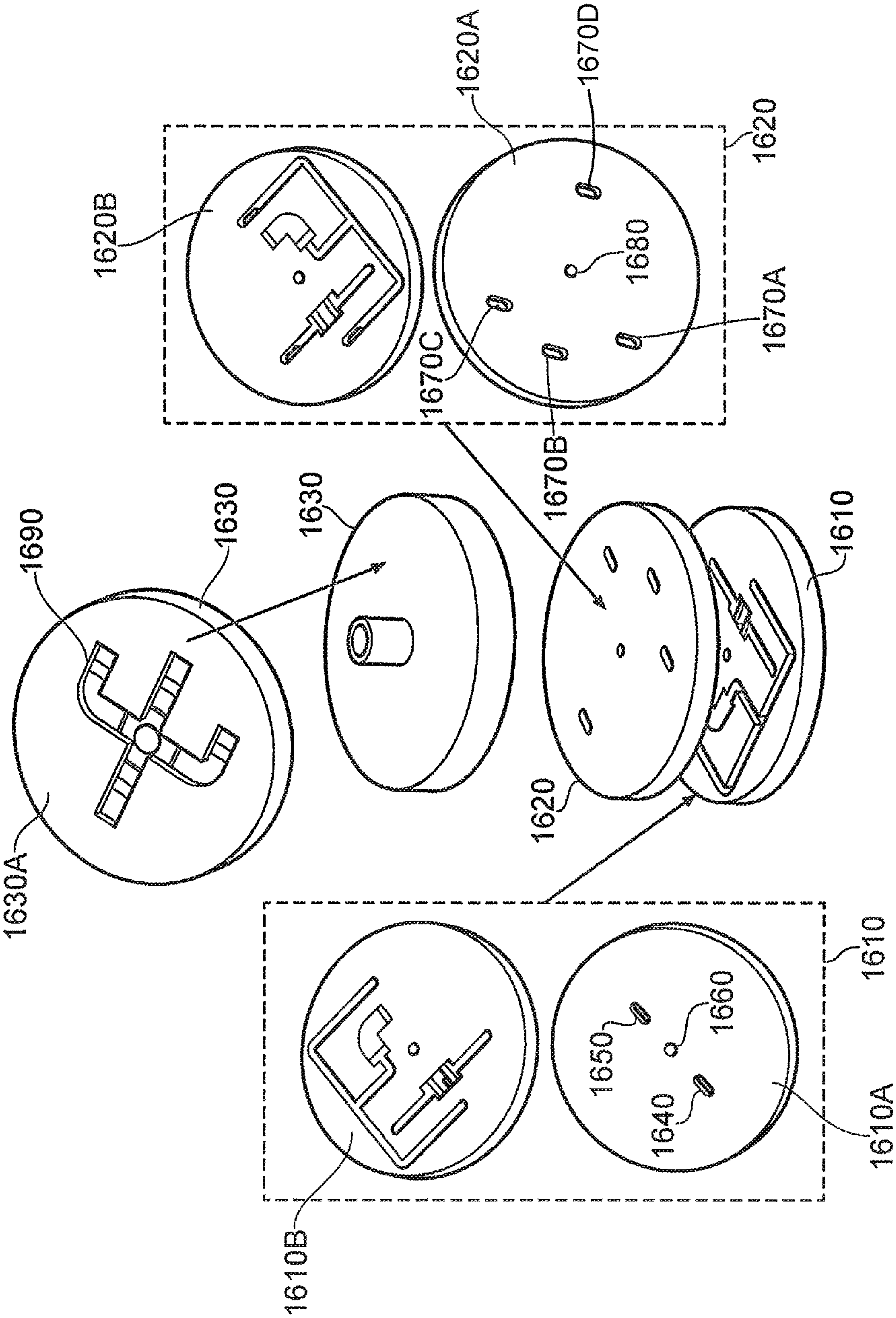
FIG. 16 illustrates example stacked components of the antenna feed of the subject matter described herein.

As illustrated in FIG. 16, the components of the antenna feed can be manufactured using a stacked series of discs or sheets. This is possible due to the use of a waveguide layout. In this example, three discs 1610, 1620, 1630 are provided. Each disc 1610, 1620, 1630 has two sides which are machined to define voids which define the waveguides and other structures mentioned above. In particular, the disc 1610 has on one side 1610A a rectangular port 1640 which receives a low frequency signal in a first polarization and a rectangular port 1650 which receives a low frequency signal in another polarization. A circular port 1660 receives a higher frequency signal. The other side 1610B of the plate 1610 together with one side 1620B of the plate 1620 defines the E-plane T-junctions, waveguide symmetric rotators and looped waveguides. The side 1620A has waveguides 1670A, 1670B, 1670C, and 1670D which provide the two low frequency signals with opposing phases to the coaxial turnstile junction 1690 on side 1630A, with the high frequency signal passing through the waveguide 1680. This provides for simplicity of manufacturing, with the opportunity to realise the whole feeding system by machining three components before assembling them together.

Although the above has been described operating with signals propagating from the ports to the antenna port, it will be appreciated that the reverse operation is possible with signals received from the antenna propagating from antenna port, undergoing coaxial mode to rectangular mode conversion by the turnstile junction, propagating through the looped waveguides, being combined by the E-plane T-junction and supplied to the appropriate user port(s). Likewise, the signal received by the circular waveguide may also be supplied appropriate port.

Accordingly, it can be seen that the antenna feed can typically: feed and convert the two input $TE_{10}$ rectangular modes to the appropriate $TE_{11}$ coaxial waveguide mode and $TE_{11}$ circular mode of the dual band backfire feed; make independent the polarization between the low frequency band and the high frequency band; and obtain a simple and compact feeding system in which the manufacturing by machining process is possible.

The antenna feed is typically intended for microwave antennas for the backhaul applications and provides an approach to feed and convert at the same time the two input $TE_{10}$ rectangular modes to the appropriate $TE_{11}$ coaxial waveguide mode and $TE_{11}$ circular mode of the dual band backfire feed with the possibility to manage independently the antenna polarization. Instead of using a progressive conversion mode from the coaxial mode to the rectangular mode, the feed uses a turnstile coaxial junction to excite directly the $TE_{11}$ coaxial waveguide mode from the $TE_{10}$ rectangular waveguide mode associated to an E-plane T-junction for the first frequency band and uses both the inner conductor of the coaxial waveguide as a circular waveguide pipe for the second frequency band.

It will be appreciated that due to the waveguide layout in the low band, it is possible to go straight through the feeding system and therefore supply the RF signal either via a rectangular input, in this case with use the rectangular to circular transition, or via a circular input port with the possibility to propagate both polarizations, vertical and horizontal in these examples, in $TE_{11}$ circular mode. This last case can be operated only if the waveguide is straight without bending, to avoid the polarization rotation.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:

a first port configured to convey a first signal at a first frequency;

a second port configured to convey a second signal at a second frequency, said second frequency being higher than said first frequency;

a third port configured to convey said first signal and said second signal with a feed for a multiband antenna, said third port having an inner waveguide and a coaxial waveguide;

wherein said first port is coupled with said coaxial waveguide by a first network configured to propagate said first signal between said first port and said coaxial waveguide; and wherein said second port is coupled with said inner waveguide by a second network configured to propagate said second signal between said second port and said inner waveguide, wherein said first network comprises a coaxial turnstile junction, having junction waveguides extending radially therefrom, configured to convert said first signal between a first mode in said first network and a coaxial mode in said coaxial waveguide and wherein the coaxial turnstile junction comprises tuning surface variations on the junction waveguides, said first network comprises a first signal splitter configured to convert between said first signal and an in-phase first signal and an opposing phase first signal, and said first signal splitter comprises a T-junction splitter having a splitter port configured to convey said first signal, an in-phase port configured to convey said in-phase first signal and an opposing phase port configured to convey said opposing phase first signal.

2. The apparatus of claim 1, wherein said coaxial waveguide at least partially surrounds said inner waveguide.

3. The apparatus of claim 1, wherein an inner surface of said coaxial waveguide defines an outer surface of said inner waveguide.

4. The apparatus of claim 1, wherein an inner diameter of said inner waveguide is selected to propagate a designated mode.

5. The apparatus of claim 4, wherein an outer diameter of said inner waveguide together with said inner diameter of said coaxial waveguide is selected to propagate a different designated mode.

6. The apparatus of claim 1, wherein said inner waveguide is dimensioned to propagate a $TE_{11}$ circular mode.

7. The apparatus of claim 1, wherein said coaxial waveguide is dimensioned to propagate a $TE_{11}$ coaxial mode.

8. The apparatus of claim 1, wherein said inner waveguide comprise a circular waveguide.

9. The apparatus of claim 1, wherein said second network comprises one of a rectangular-to-circular waveguide transition and a circular-to-circular waveguide transition.

10. The apparatus of claim 1, defined by a series of stacked plates.

11. The apparatus of claim 1, wherein said first network comprises a first pair of coupling waveguides, one of said first pair of coupling waveguides coupling said in-phase port with said turnstile junction and another of said first pair of coupling waveguides coupling said opposing phase port with said turnstile junction.

12. The apparatus of claim 11, wherein said one of said first pair of coupling waveguides couples with one side of said turnstile junction and said another of said first pair of coupling waveguides couples with an opposing side of said turnstile junction.

13. The apparatus of claim 1, comprising a fourth port configured to convey a third signal at a third frequency and with a polarization different than a polarization of said first signal, said third frequency being higher than said first frequency and wherein said first network couples said fourth port with said coaxial waveguide and is configured to propagate said third signal between said fourth port and said coaxial waveguide.

14. The apparatus of claim 13, wherein said third frequency matches said first frequency.

15. The apparatus of claim 13, wherein said first network comprises a second signal splitter configured to convert between said third signal and an in-phase third signal and an opposing phase third signal.

16. The apparatus of claim 15, wherein said second signal splitter comprises a T-junction splitter having a splitter port configured to convey said third signal, an in-phase port configured to convey said in-phase third signal and an opposing phase port configured to convey said opposing phase third signal.

17. The apparatus of claim 16, wherein said first network comprises a second pair of coupling waveguides, one of said second pair of coupling waveguides coupling said in-phase port with said turnstile junction and another of said second pair of coupling waveguides coupling said opposing phase port with said turnstile junction.

18. The apparatus of claim 17, wherein said one of said second pair of coupling waveguides couples with one side of said turnstile junction and said another of said second pair of coupling waveguides couples with an opposing side of said turnstile junction.

19. The apparatus of claim 17, wherein said second pair of coupling waveguides couple with said turnstile junction at positions intermediate said first pair of coupling waveguides.

20. The apparatus of claim 13, wherein said first signal and third signal have a matching frequency and differing polarizations.

21. The apparatus of claim 1, wherein said apparatus comprises a backfire dual band feed.

22. The apparatus of claim 1, wherein said antenna comprises a parabolic antenna.

23. An antenna arrangement comprising said apparatus as claimed in claim 1.

24. The apparatus of claim 1, wherein said first network further comprises respective polarization rotators coupled between the T-junction splitter and the coaxial turnstile junction.

25. The apparatus of claim 1, wherein said junction waveguides comprise rectangular waveguides.

26. A method, comprising:

conveying a first signal at a first frequency at a first port;

conveying a second signal at a second frequency at a second port, said second frequency being higher than said first frequency;

coupling said first port with a coaxial waveguide using a first network configured to propagate said first signal between said first port and said coaxial waveguide;

coupling said second port with an inner waveguide using a second network configured to propagate said second signal between said second port and said inner waveguide; and conveying said first signal and said second signal with a third port having said inner waveguide and said coaxial waveguide, an inner surface of the coaxial waveguide defining an outer surface of the inner waveguide, and a feed for a multiband antenna, wherein said first network comprises a coaxial turnstile junction, having junction waveguides extending radially therefrom, configured to convert said first signal between a first mode in said first network and a coaxial mode in said coaxial waveguide and wherein the coaxial turnstile junction comprises tuning surface variations on the junction waveguides, said first network comprises a first signal splitter configured to convert between said first signal and an in-phase first signal and an opposing phase first signal, and said first signal splitter comprises a T-junction splitter having a splitter port configured to convey said first signal, an in-phase port configured to convey said in-phase first signal and an opposing phase port configured to convey said opposing phase first signal.

* * * * *